United States Patent [19]

Bon

[11] Patent Number: 4,984,963
[45] Date of Patent: Jan. 15, 1991

[54] STACKING BUNDLES OF FLAT-FOLDED BOXES OF CORRUGATED BOARD

[75] Inventor: Henry Bon, Vaulx-en-Velin, France

[73] Assignee: The Langston Machine Company Limited, Bristol, Great Britain

[21] Appl. No.: 183,791

[22] Filed: Apr. 20, 1988

[30] Foreign Application Priority Data

Apr. 25, 1987 [GB] United Kingdom ............... 8709851

[51] Int. Cl.⁵ .............................................. B65G 57/03
[52] U.S. Cl. ............................... 414/789.5; 414/786; 414/792; 414/792.9; 414/799; 414/924
[58] Field of Search ........................ 414/42, 57, 59, 62, 414/71, 924, 926, 794.2, 799, 786

[56] References Cited

U.S. PATENT DOCUMENTS

| | | | |
|---|---|---|---|
| 2,457,135 | 12/1948 | Deiters | 414/71 X |
| 3,471,036 | 10/1969 | Thomas et al. | 414/792.9 X |
| 3,491,901 | 1/1970 | Pearne et al. | 414/792.9 X |
| 3,618,790 | 11/1971 | Carmody | 414/71 X |
| 3,643,822 | 2/1972 | Birchall | |
| 3,693,321 | 9/1972 | Nilsson | 414/71 X |
| 3,757,966 | 9/1973 | Cox et al. | 414/71 X |
| 3,884,363 | 5/1975 | Ajlouny | 414/71 X |
| 3,889,825 | 6/1975 | Mosely | 414/42 X |
| 3,921,825 | 11/1975 | Sheehan | 414/42 X |
| 4,041,853 | 8/1977 | Verwey et al. | 100/4 |
| 4,043,097 | 8/1977 | Ishida et al. | 414/42 X |
| 4,242,025 | 12/1980 | Thibault | 414/792.9 X |
| 4,316,693 | 2/1982 | Baxtes et al. | 414/71 X |
| 4,419,035 | 12/1983 | Stobb | 414/792.9 X |
| 4,439,097 | 3/1984 | Mebus | 414/42 |
| 4,552,499 | 11/1985 | Foust et al. | 414/42 X |
| 4,772,170 | 9/1988 | Oldfield | 414/792.9 |

FOREIGN PATENT DOCUMENTS

| | | | |
|---|---|---|---|
| 0146643 | 7/1985 | European Pat. Off. | |
| 0043267 | 4/1977 | Japan | 414/924 |
| 0057128 | 4/1982 | Japan | 414/42 |
| 0130823 | 8/1983 | Japan | 414/71 |
| 1052392 | 12/1966 | United Kingdom | |
| 1258356 | 12/1971 | United Kingdom | |
| 2134066 | 8/1984 | United Kingdom | 414/62 |
| 2141397A | 12/1984 | United Kingdom | |

OTHER PUBLICATIONS

"Robot Cage Palletizer/Depalletizer", FMC Food Processing Machinery Division, 1984.

Primary Examiner—Robert J. Spar
Assistant Examiner—William M. Hienz
Attorney, Agent, or Firm—Seidel, Gonda, Lavorgna & Monaco

[57] ABSTRACT

Apparatus for stacking bundles of flat-folded corrugated board comprises structure (2) to feed the bundles (B1,B2 etc) in succession to a pick-up position (4), structure (38,60) to transfer the bundles one at a time from the pick-up position to a stacking position (5) so as to create a number of layers to form a stack of bundles at the stacking position, support structure (6) at the stacking position to receive said bundles, structure (12,11) to lower the support structure as the stack is built up, and a programmable controller (94) for automatically controlling the position and orientation at which each bundle is delivered onto the stack so that the bundles form a predetermined pattern in the stack controlled by the controller.

8 Claims, 4 Drawing Sheets

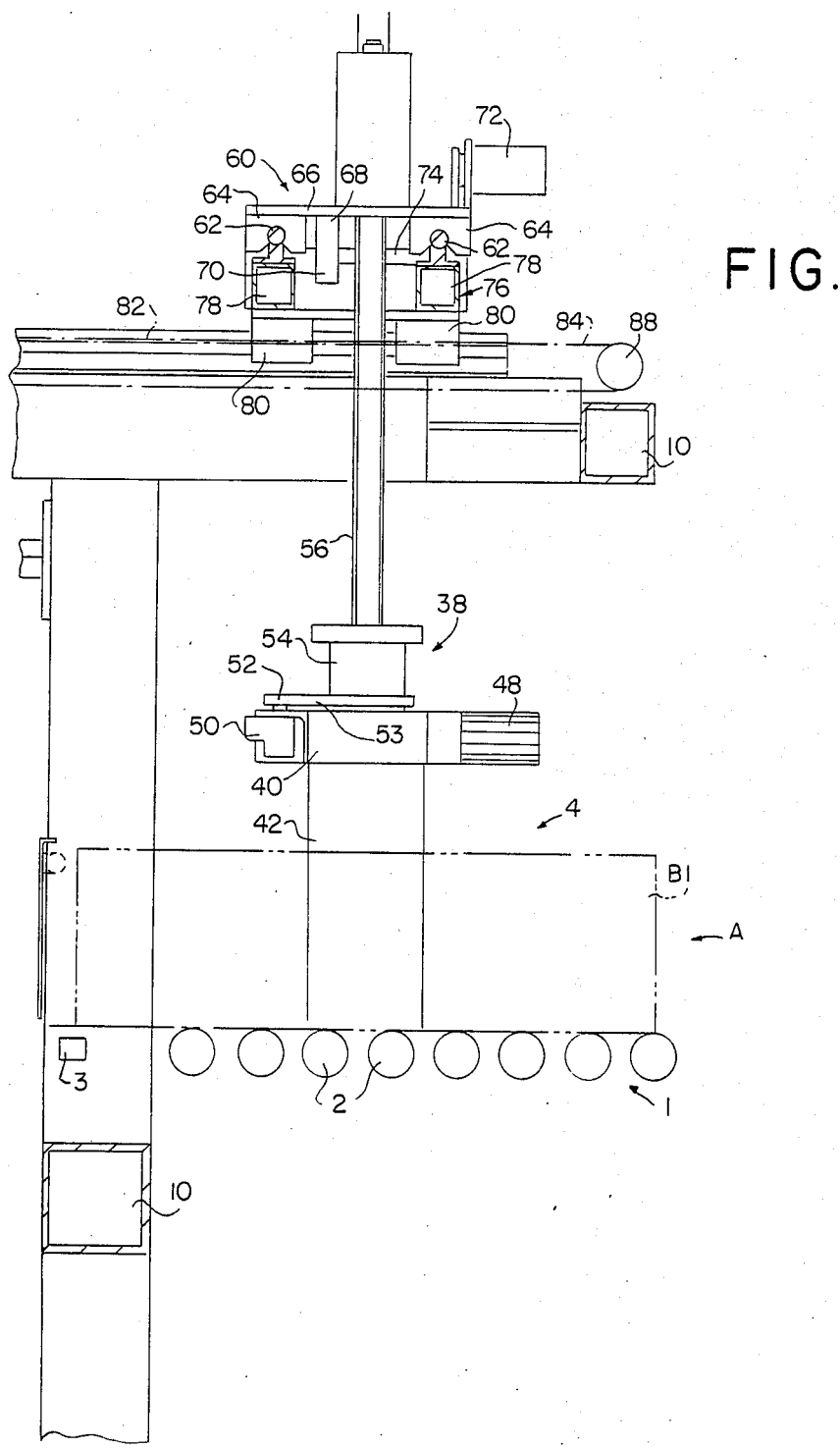
FIG. IA

STACKING BUNDLES OF FLAT-FOLDED BOXES OF CORRUGATED BOARD

This invention concerns improvements in or relating to apparatus for stacking articles onto pallets, and in particular for stacking bundles of flat-folded boxes of corrugated board.

Such flat boxes are typically delivered by a folder-gluer machine in bundles approximately 300 cms high and may comprise 25 boxes, each bundle being secured by an encircling band. The bundles are delivered sequentially onto a conveyor from which they are generally manually removed and then stacked onto pallets for transportation. The speed of production of modern machinery places a heavy burden on the workers who handle the bundles, as a number of movements in the stacking operation using existing apparatus require the bundles to be manipulated by hand.

According to the present invention there is provided apparatus for stacking bundles of flat-folded corrugated board, comprising means to feed the bundles in succession to a pick-up position, means to transfer the bundles one at a time from said pick-up position to a stacking position so as to create a number of layers to form a stack of bundles at the stacking position, support means at said stacking position to receive said bundles, means to lower said support means as the stack is built up, and a programmable control means for automatically controlling the position and orientation at which each bundle is delivered onto the stack so that the bundles form a predetermined pattern in the stack controlled by the control means.

The invention will now be described, by way of example only, with reference to the accompanying drawings in which:

FIG. 1A is an enlarged view of the top right corner area of FIG. 1;

Figure 1:
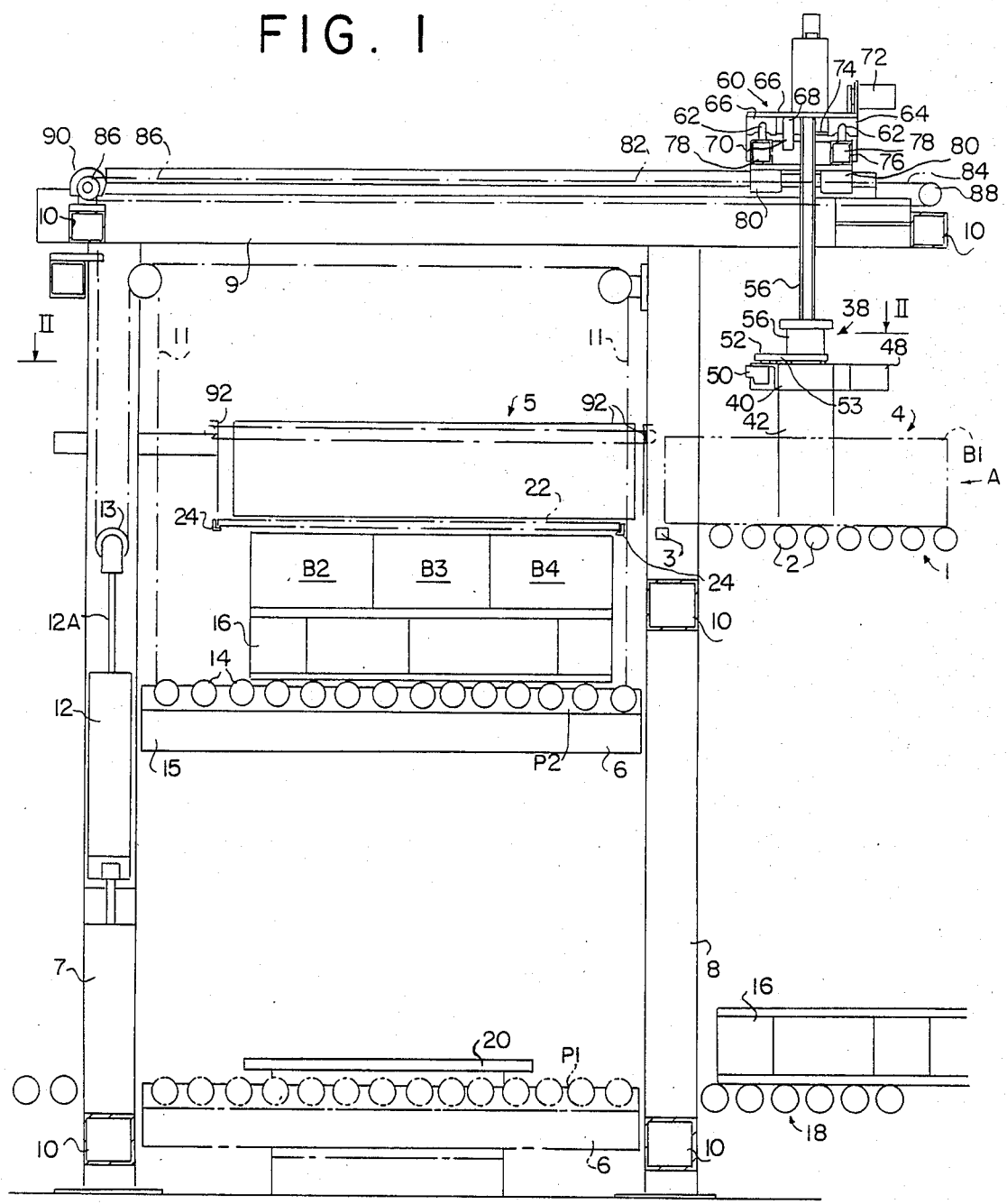
FIG. 1 is a diagrammatic side view of apparatus for stacking bundles of flat-folded boxes according to the invention.

Referring to the drawings, bundles of folded boxes are fed, in known manner, in the direction of arrow 'A' in FIG. 1, from a folder-gluer machine (not shown). Each bundle in turn is conveyed by a roller conveyor 1, the rollers 2 of which are driven by a motor (not shown) until the leading bundle is detected by a photo-electric detector 3, at which time the motor is stopped, and the bundle comes to rest at a pick-up position 4. A bundle B1 is shown in this position in FIGS. 1 and 2. The bundle is then transferred to a stacking position 5 at which a stack of bundles is formed on a platform 6 as will be described later.

The platform 6 is mounted for vertical movement between two side frames each comprising a pair of upright tubes 7, 8 and a top horizontal tube 9, the frames being joined by cross tubes 10. The platform 6 is suspended at its corners by chains 11, which are fixed at one end to the platform and at the other end to one of the side frames. Carried on each side frame is a pneumatic cylinder 12 each having a piston rod 12A which carries a sprocket 13 engaging two of the chains 11. Thus as the cylinders 12 are operated, retracting or extending the rods 12A the platform 6 is raised or lowered. The platform 6 comprises a plurality of rollers 14 rotatably carried on a frame 15.

When the apparatus is first started, the platform 6 is positioned at its lowest level, shown at P1 in FIG. 1, and a pallet 16 is fed from a roller conveyor 18 onto the rollers 14 of the platform. A movable stop (not shown) may be provided to locate the pallet in its feed direction, the pallet being located sideways in the desired position by a movable jogging plate 20 adapted to engage a side of the pallet and to displace the pallet sideways to a predetermined position. The platform 6 is then raised by the cylinders 12 until the top surface of the pallet 16 is at a level slightly below that of the bundle B1 at the pick-up position 4.

Figure 2:
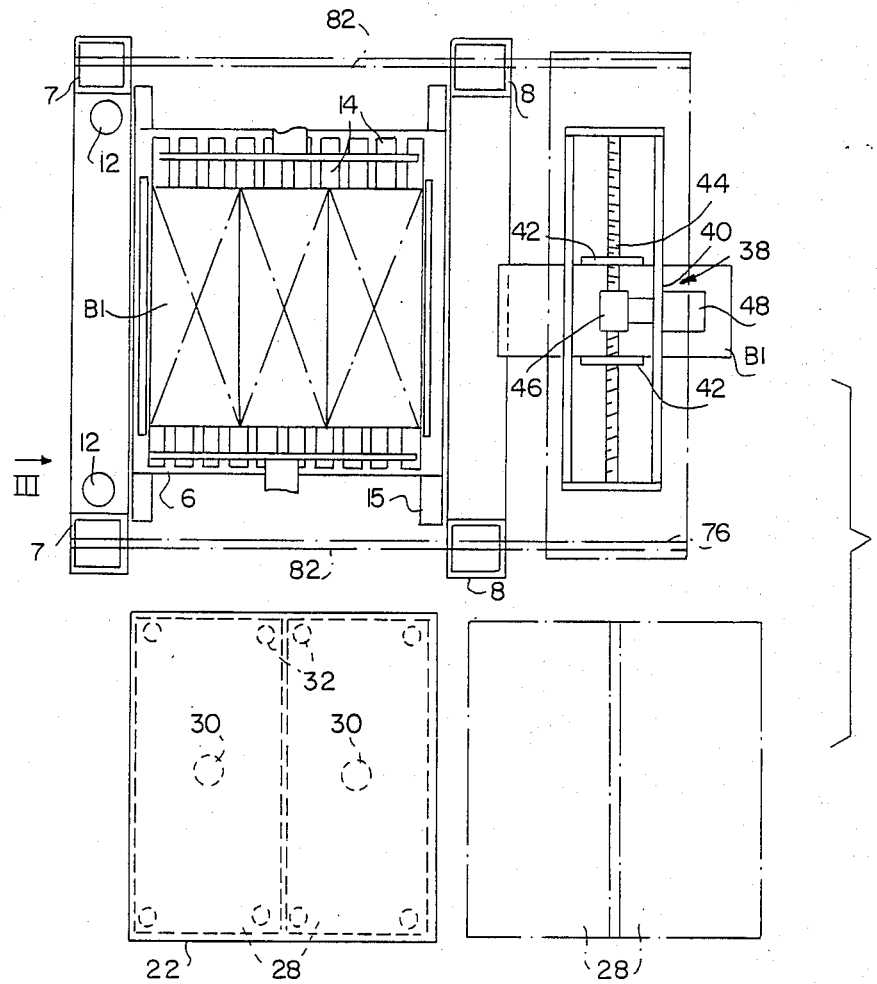
FIG. 2 is a diagrammatic plan view which specifically is a section on the line II—II in FIG. 1.
Figure 3:
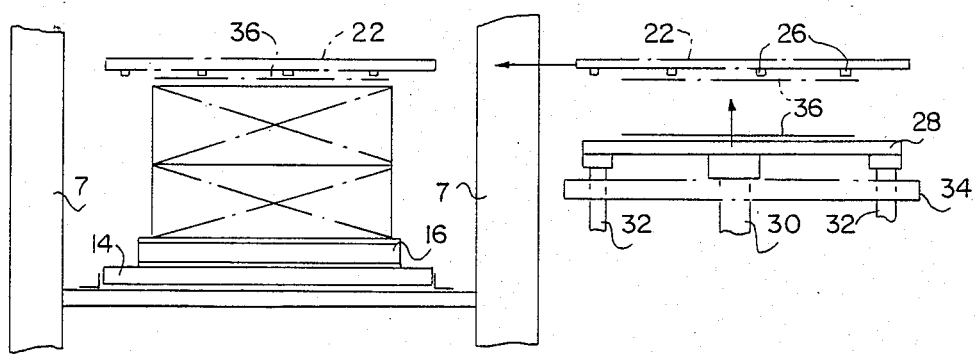
FIG. 3 is a view in the direction of arrow III of FIG. 2.

A divider sheet is then placed on top of the pallet as will now be described with reference to FIGS. 2 and 3. A delivery table 22 is mounted on guides 24 (FIG. 1) so that it can be moved between a loading position shown in full lines in FIG. 3, and a delivery position shown in chain-dot lines, such movement being effected automatically by a suitable drive means (not shown). The table 22 has nozzles 26 in its bottom surface to which suction is applied in any convenient manner. Located below the table 22 is a pair of support tables 28 which are moved by pneumatic cylinders 30. The tables 28 are constrained to move vertically by guide rods 32 slideable in a frame 34. The frame 34 and thus also the tables 28 are movable between the dotted line position and that shown in chain-dot lines in FIG. 2. With the tables 28 in the chain-dot position of FIG. 2, the operator places a divider sheet 36 on one or both of the tables 28, depending on its size, and the frame is moved to bring the sheet 36 beneath the table 22. The cylinders 30 are then operated to lift the sheet 36 up to the nozzles 26 to which suction is then applied to grip the sheet. Table 22 is then moved along guides 24 until the sheet 36 is positioned above the pallet at the stacking position 5. Suction is then removed from nozzles 26 and the sheet 36 drops onto the top of pallet 16.

The placing of divider sheets on the tables 28 may alternatively be effected automatically.

When the detector 3 detects the bundle B1 at pick-up position 4, a transfer unit 38 engages the bundle B1 and transfers it to the stacking position 5 as will now be described. For this purpose the unit 38 comprises a gripping head 40 provided with a pair of downwardly extending plates 42 which are supported on a bar 44 rotatably supported in the head 40. The center portion of the bar 44 passes through a right angle drive gear box 46 which is driven by a motor 48. On opposite sides of the gear box 46 the bar 44 is provided with left and right hand threads and one of the plates 42 is threaded on to each threaded portion, so that depending on the direction of rotation of the bar 44 the plates 42 move either closer together or further apart. Also carried on the head 40 is an air motor 50 which drives a pinion 52 to rotate the head 40 about a vertical axis with respect to a fixed central part 54; for this purpose the pinion 52 engages in a toothed belt 53 which also extends around and meshes with a larger pinion fixed to the non-rotating part 54, so that rotation of the pinion causes the entire gripping head to rotate about a vertical axis.

The gripping head 40 is supported at one end of a pair of rods 56 which are carried by a movable carriage 60. The rods 56 are threaded and engage captive nuts (not shown) so that as the rods 56 are rotated the threads engaging the nuts cause the rods 56 to move lengthwise and thus raise or lower the gripping head 40. The carriage 60 is supported on a pair of rails 62 by blocks 64 provided on the underside of a plate 66. Fixed to the underside of the plate 66 is a toothed rack 68. A pinion 70 engages the rack and is driven from a motor 72 through a belt drive (not shown) and shaft 74. The rails 62 lie between the top tubes 9 so that by operating the motor 72 the carriage is moved along the rails.

The carriage 60 is, in turn, mounted on a further carriage 76, provided with a pair of hollow beams 78, which carry the rails 62. The beams 78 are secured to blocks 80 which slide on rails 82 supported on top of the tubes 9. Running alongside each of the tubes 9 is a drive belt 84 which extends between pulleys 86 and 88, the pulleys 86 being driven by a motor 90 so that the gripping head can be moved in the direction of the rails 82.

With the bundle B1 at position 4 and the gripping head 40 in the position shown in FIG. 1 the motor 48 is operated to move the plates 42 so as to grip the bundle. The rods 56 are then rotated to raise the gripping head 40 and thus the bundle from the rollers 2. The bundle B1 is then moved to a position above the pallet 16 by operating the motor 90. Depending upon the desired orientation of the bundle B1 on the pallet the motors 50, 72 and 90 are operated as necessary. In the drawings (FIG. 2 in particular) it is assumed, by way of example, that each layer of bundles will comprise three bundles each rotated in a horizontal plane through 90° in a clockwise direction from the position they occupy when in position 4. To achieve this, as the gripping head 40 is being moved by motor 90, the air motor 50 is operated to rotate the head 40 through 90° in a clockwise direction as viewed in FIG. 2. The motor 72 is operated to move the bundle parallel along the rails 62 if the desired location of the bundle on the pallet requires it. The rods 56 are then rotated to lower the head 40 so as to place the bundle at the desired location on the pallet. The head 40 is then returned to the pick-up position and transfers the next bundle to a position alongside the bundle already on the pallet 16. When three bundles have been transferred to the stacking position 5, jogging plates 92 are operated to align the bundles in the exact position desired on the pallet. The cylinders 12 are then operated to lower the platform 6 to the position shown in FIG. 1 at P2, so that three bundles B2, B3, B4 are laid on the pallet as shown in FIGS. 1 and 2.

The sequence of operations described above is then repeated to place further layers of bundles at the stacking position 5. In order to help stabilize the stack as it grows higher, a divider sheet 36 is placed between successive layers of bundles, as described above, or at greater intervals.

When the stack of bundles comprises the desired number of layers of bundles, the operation of the gripping head is inhibited whilst the loaded pallet is removed and replaced by a new pallet as described above.

In a modified form of apparatus the gripper plates 42 are provided with small ledges along their bottom edges to prevent any slipping of the bundles whilst being carried between the plates 42.

In a further modification the delivery table is modified so that it can support the weight of the number of bundles which comprise a layer. In this case, whilst a full pallet is being removed and a new one inserted, the operation of the transfer unit continues and a layer of bundles is formed on top of the delivery table 22 which is operated as described above in relation to the insertion of divider sheets 36. Further, in this case, as the delivery table 22 is withdrawn, a movable stop is positioned above the table to prevent the layer of bundles from moving with the table 22 as it is withdrawn, so that the bundles are pushed onto the pallet.

Figure 4:
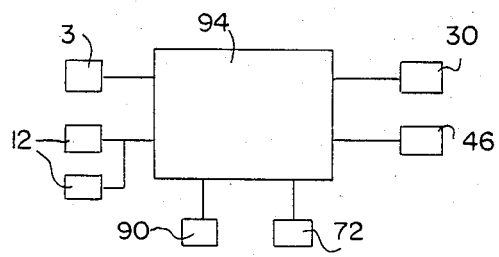
FIG. 4 is a block diagram of the control system.
Figure 5:
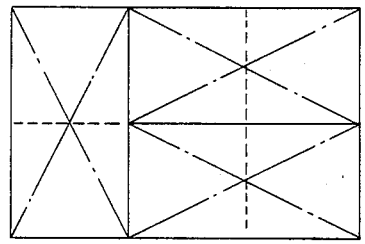
FIG. 5 shows one example, in plan view, of a possible pattern of bundles on a pallet.

In order to operate the apparatus automatically the various operating units are connected to a programmable control unit 94, shown in FIG. 4. The unit 94 is a micro-processor which the operator programs according to the parameters necessary to build the desired stack of bundles on the pallet, e.g. the size, number and positions (including orientations) of bundles in a layer, and the number of layers. For example, the controller may be programmed to form triple-bundle layers as shown in FIG. 5, with divider sheets between successive layers (or at greater intervals) to lock together frictionally what would otherwise be separate columns of bundles; alternatively the bundles in alternate layers may be differently positioned, as shown by the dotted lines in FIG. 5, so that the bundles in successive layers lock together frictionally and therefore possibly do not need divider sheets for that purpose.

The provision in the above apparatus of means for automatically inserting divider sheets (or what might be better termed "tie sheets") is an important aspect of this invention which may be used independently of certain other of the features of this invention. The intervals at which sheets are inserted may be determined automatically by the control unit (computer) through operation of suitable optimization software which also determines the optimum bundle pattern for a bundle of given dimensions. The bundle dimensions may be input by the operator or may be received from the folder-gluer machine which produces the bundles of flat-folded boxes.

I claim:

1. Apparatus for stacking bundles of flat-folded corrugated board, comprising means to feed the bundles in succession to a pick-up position, means to transfer the bundles one at a time from said pick-up position to a stacking position so as to create a number of layers forming a stack of bundles at the stacking position, each layer including a plurality of bundles, said transfer means including means for gripping bundles substantially by vertical surfaces thereof, support means at said stacking position to receive said bundles, means to lower said support means as the stack is built up, means for automatically inserting a horizontal divider sheet for frictionally tying together adjacent bundles contacting the divider sheet at at least one selected position between adjacent layers of bundles in the stack, and a programmable control means for automatically controlling the position and orientation at which each bundle is delivered onto the stack and for controlling the sheet insertion means so that the bundles form a predetermined pattern in the stack controlled by the control means, at least two layers having different bundle patterns determined automatically by the control means for substantially optimal stacking of the bundles, wherein the means for transferring bundles from the pick-up position to the stacking position comprises means for raising and lowering the gripping means, means for moving the gripping means horizontally in two directions, and means for rotating the gripping means about a vertical axis, all of said immediately previously recited movement-producing means being controlled by the control means.

2. Apparatus according to claim 1 in which the means for inserting divider sheets comprises a table formed with suction means for gripping a divider sheet against the underneath surface of the table, the table being horizontally movable between a position at which it is adapted to pick up a divider sheet and a position above the stacking position for the bundles, suction being automatically cut off at the latter position so as to drip the divider sheet onto the bundles at the stacking position, and the table being then automatically moved back to the first position for receiving the next divider sheet.

3. Apparatus according to claim 2 in which the table is supported at its side edges by horizontal guides for movement between the respective positions.

4. Apparatus according to claim 1 in which the support means at the stacking position includes a pallet on which the bundles are to be stacked.

5. Apparatus according to claim 4 including a roller conveyor for automatically conveying successive pallets to the stacking position.

6. Apparatus according to claim 1 in which said means for gripping bundles comprises a pair of vertically disposed horizontally movable grippers movable toward and away from each other for engaging the sides of the bundles.

7. Apparatus for stacking bundles of flat-folded corrugated board, comprising means to feed the bundles in succession to a pick-up position, means to transfer the bundles one at a time from said pick-up position to a stacking position so as to create a number of layers forming a stack of bundles at the stacking position, each layer including a plurality of bundles, said transfer means including means for gripping bundles substantially by vertical surfaces thereof, support means at said stacking position to receive said bundles, means to lower said support means as the stack is built up, means for automatically inserting a horizontal divider sheet for frictionally tying together adjacent bundles contacting the divider sheet at at least one selected position between adjacent layers of bundles in the stack, and a programmable control means for automatically controlling the position and orientation at which each bundle is delivered onto the stack and for controlling the sheet insertion means so that the bundles form a predetermined pattern in the stack controlled by the control means, at least two layers having different bundle patterns determined automatically by the control means for substantially optimal stacking of the bundles, wherein the means for transferring bundles from the pick-up position to the stacking position comprises means for raising and lowering the gripping means, means for moving the gripping means horizontally in two directions, and means for rotating the gripping means about a vertical axis, all of said immediately previously recited movement-producing means being controlled by the control means.

8. A method of stacking bundles of flat-folded corrugated board, comprising the steps of feeding the bundles in succession to a pick-up position, gripping and transferring the bundles one at a time from said pick-up position to a stacking position so as to create a number of layers forming a stack of bundles at the stacking position, each layer including a plurality of bundles, supporting the stack at the stacking position by means which are lowered as the stack is built up, inserting a horizontal divider sheet for frictionally tying together adjacent bundles contacting the divider sheet at at least one selected position between adjacent layers of bundles in the stack, and controlling the position and orientation at which each bundle is delivered onto the stack and the insertion of the horizontal divider sheet by programmable control means so that the bundles form a predetermined pattern in the stack controlled by the control means, at least two layers having different bundles patterns determined automatically by the control means for substantially optimal stacking of the bundles, wherein the step of gripping and transferring includes using a transfer means capable of raising and lowering the gripped bundles, moving the gripped bundles horizontally in two directions, and rotating the gripped bundles about a vertical axis, and raising, lowering, moving, and rotating steps being controlled by the control means.

* * * * *